(12) United States Patent
Schroeder et al.

(10) Patent No.: US 11,433,611 B2
(45) Date of Patent: Sep. 6, 2022

(54) DUAL HOB DRIVE QUICK RELEASE HIGH FLOW FILAMENT EXTRUDER

(71) Applicant: 3DP Unlimited, LLC, Roscoe, IL (US)

(72) Inventors: Robert Schroeder, Machesney Park, IL (US); Jonathan R. Schroeder, South Beloit, IL (US); Joseph A. Binka, Belvidere, IL (US); Kenshin Ushiroda, Beloit, WI (US)

(73) Assignee: 3DP Unlimited, LLC, Roscoe, IL (US)

( * ) Notice: Subject to any disclaimer, the term of this patent is extended or adjusted under 35 U.S.C. 154(b) by 212 days.

(21) Appl. No.: 16/570,692

(22) Filed: Sep. 13, 2019

(65) Prior Publication Data

US 2020/0001534 A1 Jan. 2, 2020

Related U.S. Application Data

(63) Continuation of application No. PCT/US2018/022561, filed on Mar. 15, 2018.

(60) Provisional application No. 62/473,108, filed on Mar. 17, 2017.

(51) Int. Cl.

| *B29C 64/321* | (2017.01) |
| *B29C 64/209* | (2017.01) |
| *B29C 64/295* | (2017.01) |
| *B33Y 30/00* | (2015.01) |
| *B29C 64/118* | (2017.01) |
| *B33Y 40/00* | (2020.01) |

(52) U.S. Cl.
CPC .......... *B29C 64/321* (2017.08); *B29C 64/209* (2017.08); *B29C 64/295* (2017.08); *B29C 64/118* (2017.08); *B33Y 30/00* (2014.12); *B33Y 40/00* (2014.12)

(58) Field of Classification Search
CPC ... B29C 64/118; B29C 64/209; B29C 64/227; B29C 64/295; B29C 64/321; B33Y 30/00; B33Y 40/00
See application file for complete search history.

(56) References Cited

U.S. PATENT DOCUMENTS

| 2007/0003656 A1 | 1/2007 | LaBossiere et al. | |
| 2007/0175879 A1* | 8/2007 | Jones | H05B 3/56 |
| | | | 219/213 |
| 2012/0018924 A1* | 1/2012 | Swanson | B29C 64/118 |
| | | | 264/401 |
| 2014/0120196 A1* | 5/2014 | Schmehl | B29C 64/386 |
| | | | 425/190 |

(Continued)

FOREIGN PATENT DOCUMENTS

KR 10-2016-0142617 12/2016

*Primary Examiner* — Xiao S Zhao
*Assistant Examiner* — Joseph S Leyson
(74) *Attorney, Agent, or Firm* — Reinhart Boerner Van Deuren P.C.

(57) ABSTRACT

A filament drive for an extruder for an additive manufacturing system is provided. A drive gear is driven by a motor. A first driven gear is operably driven by the drive gear. A first hob has a toothed outer periphery connected to the first driven gear. A second driven gear is operably driven by the drive gear. A second hob has a toothed outer periphery connected to the second driven gear. The toothed outer peripheries of the first and second hobs define a filament receiving zone therebetween. A filament extruder including a heating element operated at greater than 48 volts may be provided.

16 Claims, 7 Drawing Sheets

(56) References Cited

U.S. PATENT DOCUMENTS

| | | | |
|---|---|---|---|
| 2014/0159273 A1 | 6/2014 | Koop et al. | |
| 2014/0159284 A1 | 6/2014 | Leavitt | |
| 2015/0037446 A1 | 2/2015 | Douglass et al. | |
| 2017/0293311 A1* | 10/2017 | Rappoport | G05B 15/02 |

* cited by examiner

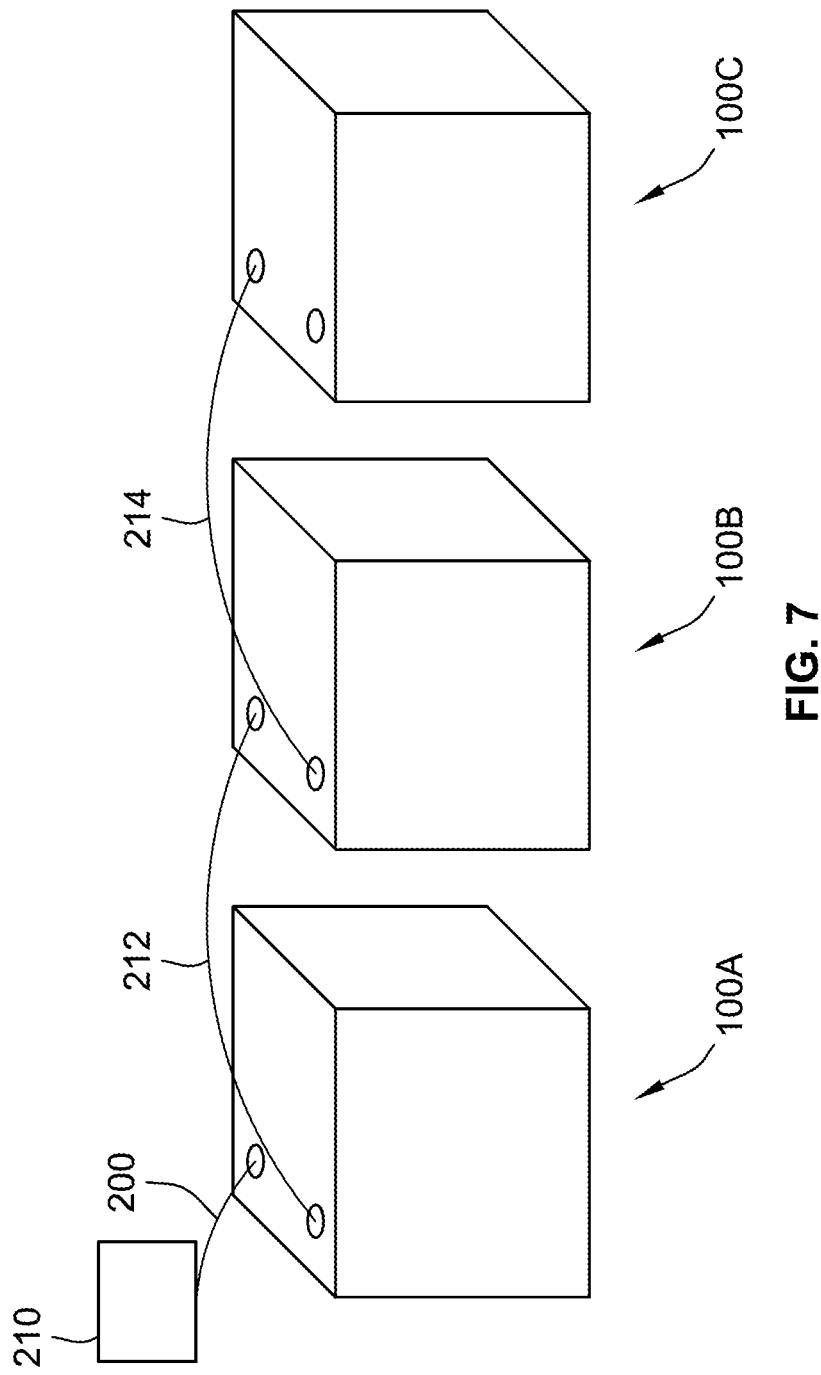

DUAL HOB DRIVE QUICK RELEASE HIGH FLOW FILAMENT EXTRUDER

CROSS-REFERENCE TO RELATED PATENT APPLICATIONS

This patent application is a continuation of PCT/US2018/022561, filed Mar. 15, 2018, which claims the benefit of U.S. Provisional Patent Application No. 62/473,108, filed Mar. 17, 2017, the entire teachings and disclosure of which are incorporated herein by reference thereto.

FIELD OF THE INVENTION

This invention generally relates to filament extruders for additive manufacturing systems.

BACKGROUND OF THE INVENTION

One type of additive manufacturing system (e.g. 3D-printers) uses an extruder system to form layers of material to form 3D products. One extruder system uses a continuous filament fed through a heating barrel to melt the filament as it is being deposited to form the layers of the 3D product.

Filament extruders push plastic filament through the heating barrel by pinching the filament between two rollers. Usually, only one roller is toothed and is called a hob. The hob is rotated by a motor. The second roller is typically smooth and is free rolling. The second roller is simply used to apply a pinching force on the opposite side of the filament via spring load or screw tension.

Filament with a diameter larger than 3 mm requires a large force and is difficult to extrude with only single hob extruders. If one tries to extrude too fast, the hob wheel will slip on the filament. This often leads to a failed print.

Also, known extruders on the market rely on low voltage (<48V) circuitry to power the heating element that heats the heating barrel. Increasing the diameter of the filament means that more power (Watts) is required to melt the plastic at an acceptable rate. Keeping the same voltage requires a much higher amperage, which is problematic from a design and safety standpoint.

Embodiments of the present invention provide improvements over the current state of the art by allowing for improved additive manufacturing using larger diameter filaments.

BRIEF SUMMARY OF THE INVENTION

New and improved filament extruders, filament drives for filament extruders, and systems of multiple filament extruders are provided.

In one embodiment, a filament drive for an extruder for an additive manufacturing system is provided. The filament drive includes a motor, a driven gear, first and second driven gears and first and second hobs. The drive gear is driven by the motor. The first driven gear is operably driven by the drive gear. The first hob has a toothed outer periphery connected to the first driven gear such that rotation of the first driven gear rotates the first hob about a first hob axis of rotation. The second driven gear is operably driven by the drive gear. The second hob has a toothed outer periphery connected to the second driven gear such that rotation of the second driven gear rotates the second hob about a second hob axis of rotation. The toothed outer peripheries of the first and second hobs define a filament receiving zone therebetween.

In an embodiment, the system includes a first drive shaft between the first driven gear and the first hob. The first drive shaft is rotatably supported proximate the first driven gear and is rotatably supported proximate the first hob. The system includes a second drive shaft between the second driven gear and the second hob. The second drive shaft is rotatably supported proximate the second driven gear and is rotatably supported proximate the second hob.

In an embodiment, the second drive shaft is movably mounted relative to the first drive shaft such that the end of the second drive shaft proximate the second hob can be moved toward or away from the first hob to adjust a size of the filament receiving zone therebetween.

In an embodiment, the system includes a biasing system having an engaged state providing a first amount of biasing force biasing the second hob toward the first hob and a released state providing a second amount of biasing force biasing the second hob toward the first hob. The second amount of biasing force being less than the first amount.

In an embodiment, the biasing system includes a spring operably providing the first amount of biasing force.

In an embodiment, a release mechanism is provided that transitions the biasing system between the engaged state and the released state.

In an embodiment, the second drive shaft is mounted on a pair of self-aligning bearings.

In an embodiment, the first driven gear and second driven gear remain engaged with the drive gear when the second hob is moved relative to the first hob.

In an embodiment, the first driven gear and second driven gear remain engaged with the drive gear when at least one of the first or second hobs is moved to the disengaged state where it would not engage a filament being processed.

In an embodiment, the system includes a biasing system that provides a spring loaded biasing force biasing the second hob towards the first hob.

In an embodiment, the second hob is free floating under the spring loaded biasing force biasing the second hob towards the first hob.

In a further embodiment, a filament extruder including a filament drive according to one or more of the prior embodiments is provided. The filament extruder includes an extruder barrel defining a central cavity having an inlet end and an outlet end. The inlet end aligns with the filament receiving zone of the filament drive such that filament driven by the filament drive is driven into the inlet end of the extruder barrel. The filament extruder includes at least one heating element adjacent the extruder barrel to heat filament driven through the central cavity.

In a further embodiment, a filament extruder including a filament drive, an extruder barrel, at least one heating element and a power supply is provided. The extruder barrel defines a central cavity having an inlet end and an outlet end. The extruder barrel is aligned with the filament drive such that filament driven by the filament drive is driven into the inlet end of the extruder barrel. The at least one heating element is adjacent the extruder barrel to heat filament driven through the central cavity. The power supply provides power to the at least one heating element at a voltage greater than at least 48 volts.

In an embodiment, the power supply provides power at less than 20 amps, more preferably less than 10 amps and even more preferably less than 5 amps.

In a further embodiment, an additive manufacturing machine includes a control unit; a first filament extruder directly coupled to the control unit; a second filament extruder indirectly coupled to the control unit by being coupled to the first filament extruder. This configuration prevents the need for separate wiring harnesses to extend between the control unit and each of the filament extruders.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 7 is a schematic illustration of a plurality of filament extruders in a daisy chained configuration.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
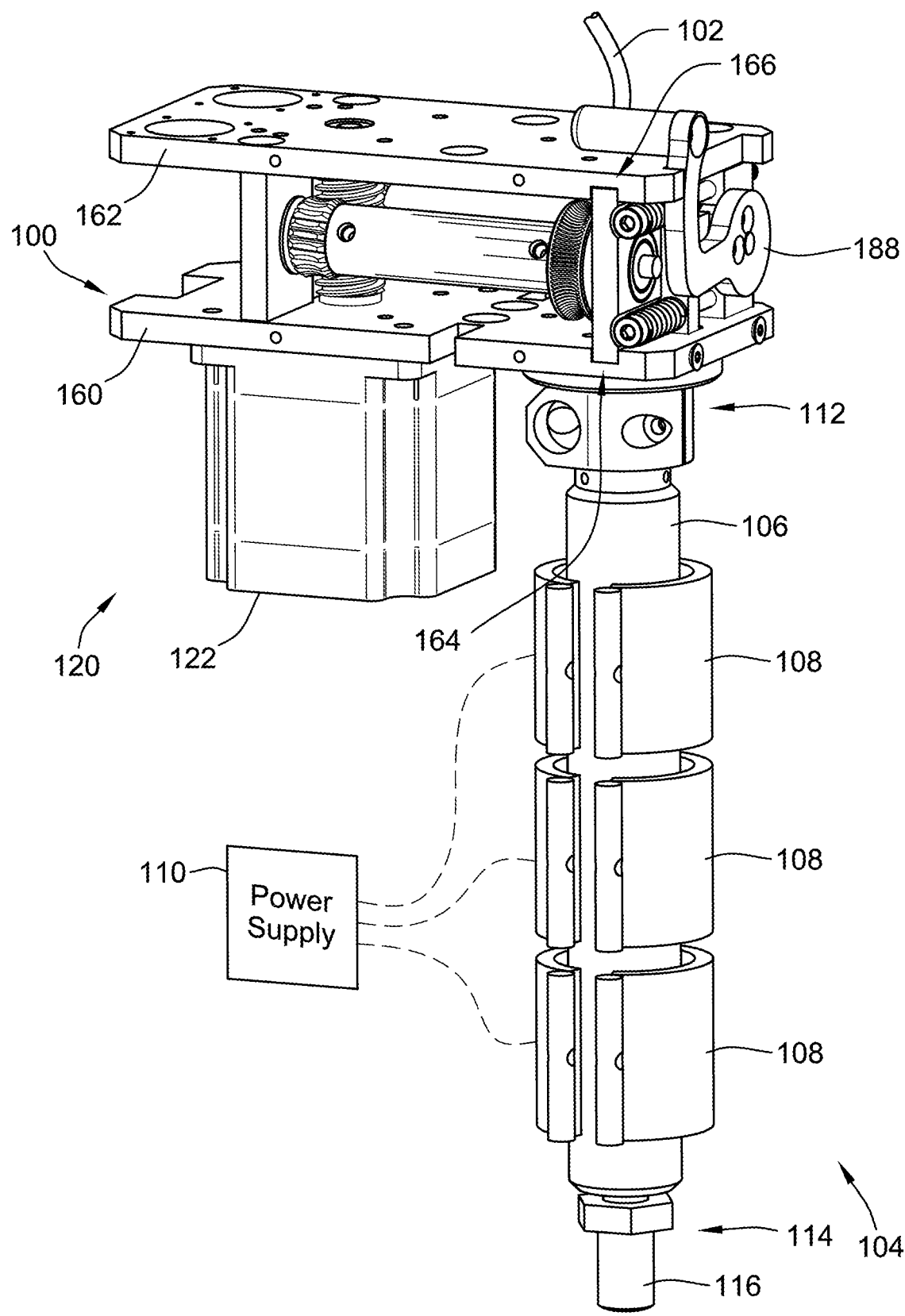
FIG. 1 is a isometric illustration of a filament extruder according to an embodiment of the invention.

FIG. 1 illustrates a filament extruder 100 for performing additive manufacturing (e.g. 3D printing). The filament extruder 100 processes a continuous plastic filament 102. The filament extruder 100 melts the plastic filament 102 and successive layers of material are extruded to form the end product.

Figure 2:
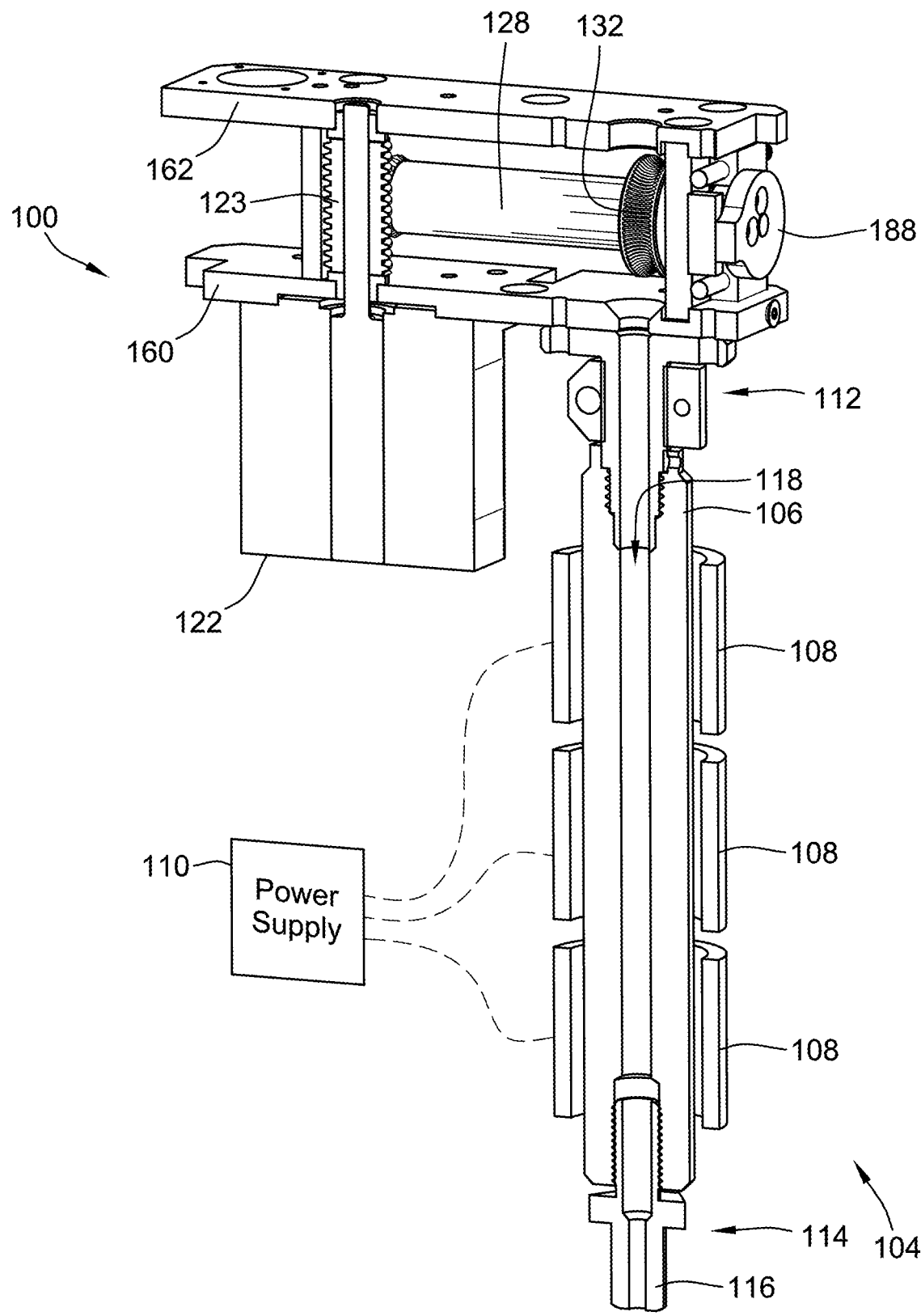
FIG. 2 is a cross-sectional illustration of the filament extruder of FIG. 1.

Filament extruder 100 includes a heating arrangement 104 that includes, among other things, a heating barrel 106, one or more heating elements 108 and a power supply 110. The heating arrangement 104, and particularly the heating barrel 106, receives the plastic filament 102 in a solid state at an inlet end 112 and forces the plastic through the heating barrel 106 where it is melted. The melted plastic is then deposited out of an outlet end 114 that includes a nozzle 116. FIG. 2 illustrates the heating barrel 106 in cross-section and illustrates a central cavity 118 through which the material travels as it is melted.

The filament extruder 100 includes a filament drive 120 for driving the filament 102 through the heating arrangement 104. With additional reference to FIG. 3, the filament drive 120 generally includes a motor 122 (FIG. 1), a drive gear 123, first and second driven gears 124, 126, first and second drive shafts 128, 130 and first and second hobs 132, 134.

The motor 122 drives drive gear 123. Drive gear 123 is preferably in the form of a worm gear. The first and second driven gears 124, 126 are located on opposite sides of an axis of rotation 134 of the drive gear 123. The first and second hobs 132, 134 are directly connected to the first and second driven gears 124, 126 by corresponding first and second drive shafts 128, 130.

Figure 3:
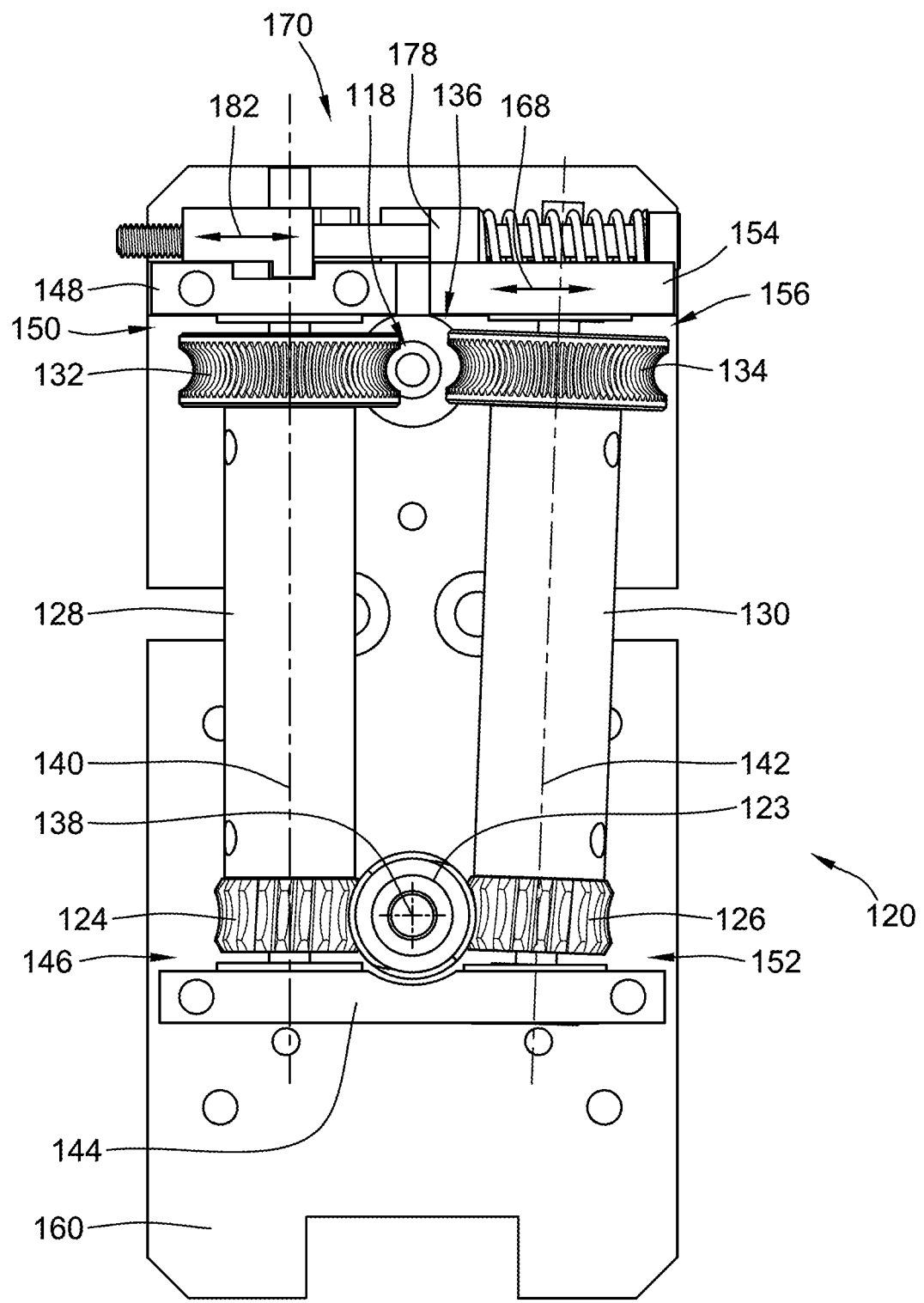
FIG. 3 is a partial top view of the filament extruder of FIG. 1.

The first and second hobs 132, 134 have toothed, concave outer peripheries configured to engage the plastic filament 102. The first and second hobs 132, 134 define a filament receiving zone 136 therebetween. The filament 102 is pinched between the first and second hobs 132, 134 in operation. By including the pair of hobs 132, 134, the filament 102 is driven from both sides increasing the amount of force that may be applied to the filament 102 to drive it through the heating arrangement. As illustrated in FIG. 3, the filament receiving zone 136 is located aligned with and above the central cavity of the heating barrel 106.

Figure 4:
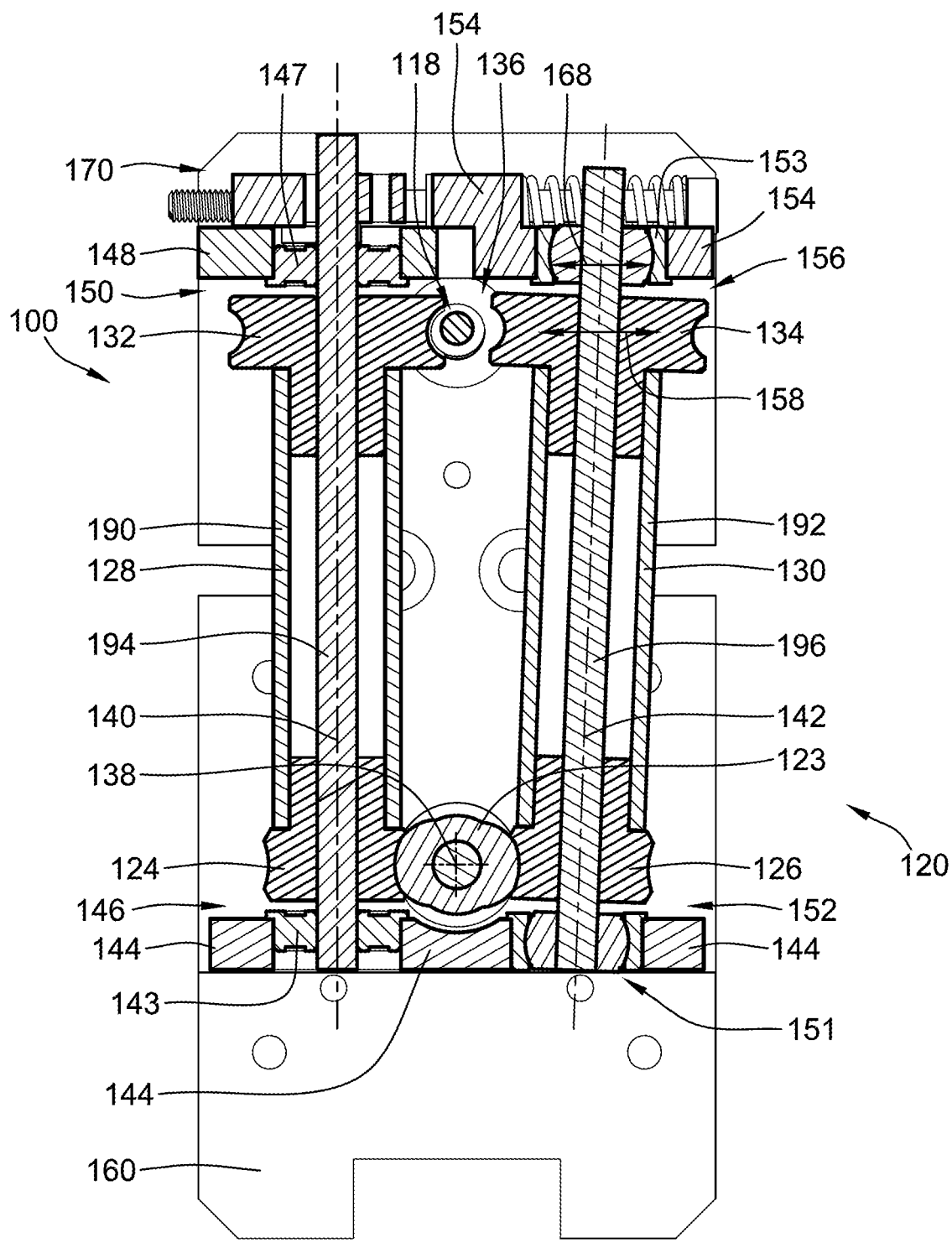
FIG. 4 is a partial cross-sectional illustration of the filament extruder of FIG. 1.

With reference to FIGS. 3 and 4, rotation of the drive gear 123 about axis of rotation 138 rotates the first and second driven gears 124, 126, first and second drive shafts 128, 130 and first and second hobs 132, 134 in opposite directions about their corresponding axes of rotation 140, 142.

The first drive shaft 128 is operably rotationally supported by a bearing 143 mounted to first support member 144 proximate first end 146 and rotationally supported by a bearing 147 mounted to a second support member 148 proximate an opposed second end 150.

The second drive shaft 130 is operably rotationally supported by a bearing 151 mounted to first support member 144 proximate first end 152 and rotationally supported by a bearing 153 mounted to a third support member 154 proximate an opposed second end 156.

Bearings 151, 153 are preferably spherical self-aligning bearings that allow the orientation of second drive shaft 130 to be adjusted so as to allow for adjustment of the position of the second hob 134 relative to the first hob 132, illustrated by arrow 158 without creating undo resistance against rotation of drive shaft 130. These bearings 151, 153 have an outer sleeve that supports an inner ring that is permitted to rotate within the outer sleeve to adjust the angle of the inner ring within the outer sleeve. Again, this allows the bearing to adjust to a change in orientation of the drive shaft 130.

First, second and third support members 144, 148, 154 are operably mounted to a frame illustrated in the form of a pair of spaced apart plates 160, 162 (see e.g. FIG. 1). While two plates are illustrated, in other embodiments, these two plates 160, 162 could be unitarily formed such as being machined from a single piece of material. In FIGS. 3 and 4, only plate 160 is illustrated. First and second support members 144, 148 are fixed relative to plates 160, 162. However, plates 160, 162 include slots 164, 166 (see e.g. FIG. 1) that allow third support member 154 slide laterally relative to the plates 160, 162 as well as first and second support members 144, 148 as illustrated by arrow 168. It is noted that because bearing 151 is in a generally fixed location (albeit able to pivot), arrows 158 and 168 are not parallel to one another except when axes 140 and 142 are parallel to one another. This is because, as third support member 154 slides as illustrated by arrow 168, the second drive shaft 130 pivot about a point defined bearing 151 which is, as noted above, a spherical self-aligning bearing. By allowing the second drive shaft 130 to adjust by pivoting about a point defined by bearing 151, limited angular adjustment of the second drive shaft 130 can occur to adjust the spacing between the first and second hobs 132, 134 while still keeping the second driven gear 126 engaged with drive gear 123. Thus, the second hob 134 can be adjusted toward or away from the first hob 132.

Figure 5:
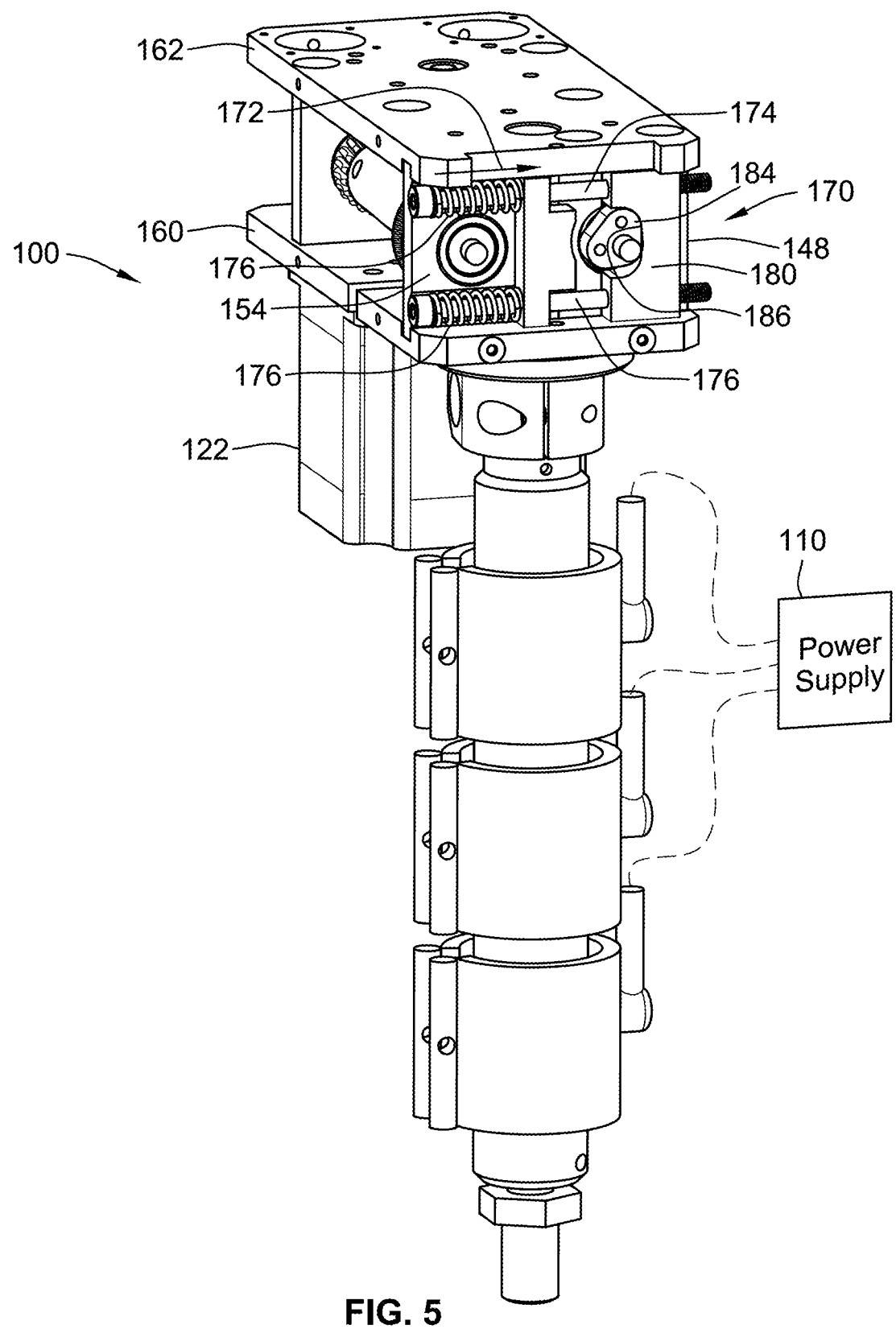
FIG. 5 is a partial isometric illustration of the filament extruder of FIG. 1.
Figure 6:
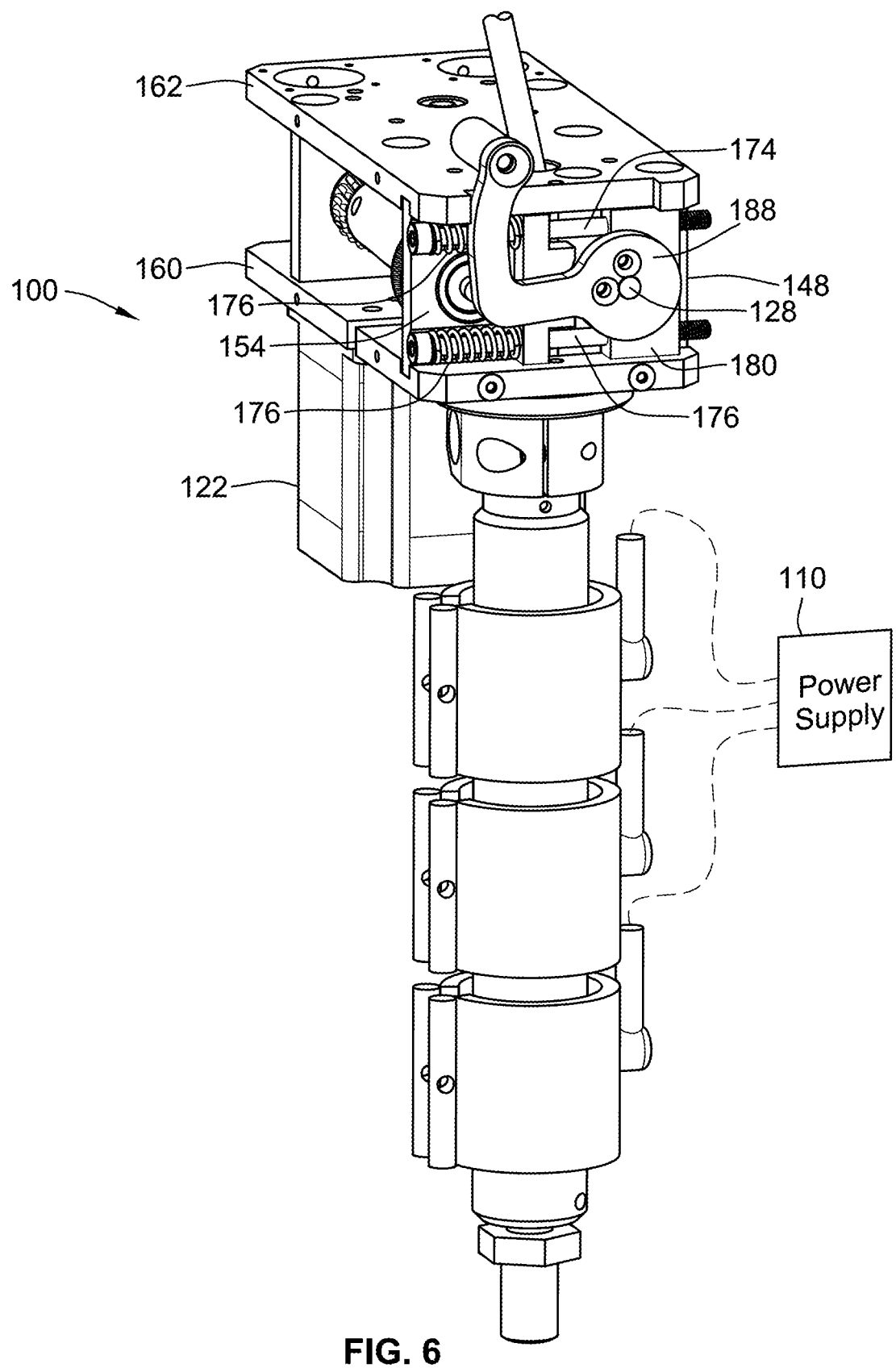
FIG. 6 is a further isometric illustration of the filament extruder of FIG. 1.

With reference to FIG. 5, a biasing system 170 is provided to bias the second hob 134 towards the first hob 132, as illustrated by arrow 172. The biasing system 170 includes a pair of pins 174 that carry springs 176. The springs 176 operably press the third support member 154 toward the second support member 148 to bias the second hob 134 towards the first hob 132.

The third support member 154 has a stepped region 178 through which the pins 174 extend and against which one end of the springs 176 presses. The stepped region 178 is allowed to slide along the pins 176.

An abutment block 180 operably floats on pins 174 and is used to adjust the biasing force provided by the biasing system 170 and particularly springs 176. The abutment block 180 can free float along pins 174 as illustrated by arrow 182 in FIG. 3. If abutment block 180 is moved away from stepped region 178, increased biasing force is applied. If abutment block 180 is moved toward stepped region 178, decreased biasing force is applied.

The biasing system 170 includes a cam arrangement that includes a cam member 184 that cooperates with a cam surface 186 provided by the abutment block 180. The cam member 184 is carried on an end of first drive shaft 128 for rotation, but could be otherwise operably rotatably mounted to the frame such as to second support member 148. The cam member has a varying radial dimension such that depending on its angular position about drive shaft 128 the abutment block 180 is spaced a different distance away from the first drive shaft 128. Thus rotation of the cam member 184 such that different portions are in contact with the cam surface 186 will adjust the amount of compression in the springs 176 and the biasing force applied by the biasing system 170.

While not illustrated in FIG. 5, FIGS. 1, 2 and 6 illustrate that a handle member 188 may be attached to or otherwise provide the cam member 184 so as to provide for easier manipulation of the cam member 184 and adjust the biasing force provided by the biasing system 170. Other biasing systems are contemplated such as simply tightening or loosening nuts on the end of the pins 174. Further, the bores in abutment block 180 could be threaded to adjust the force applied by springs 176. Further, even though the cam member 184 is provided to transition between a released state and an engaged state to provide different levels of engagement, where one level of engagement may be no engagement at all, fine adjustment of the amount of biasing force can be provided by tightening or loosening nuts on the ends of pins 174 in this embodiment. Alternatively, fine adjustment could be done where an embodiment threads the pins directly into the adjustment block by adjusting the amount of threading into the adjustment block.

In the illustrated embodiment, the cam member 186 has one segment that relates to a released state. It is portion that has the smallest radial dimension such that the abutment block 180 can be moved the closest to first drive shaft 128. This released state allows the second hob 134 to be moved the furthest away from the first hob 132 such as when filament is not being driven by the hobs 132, 134, e.g. during initial setup or when the system is offline. Thus, the current biasing system is configured to easily transition between an engaged state and a released state by simply rotating handle member 188 and the cam member 184. The handle member 188 and cam member 184 are in the released states in FIG. 1 and FIG. 5. Thus, rotation of the cam member 184 and handle member 188 allows for easily switching between different amounts of biasing force. In the illustrated embodiment, a second amount of biasing force is 0 force because the second hob 134 is entirely disengaged from any filament. However, when engaged with a filament, a second higher level of force would be provided. As illustrated in FIG. 3, the second hob 134 is spaced laterally outward beyond central cavity 118 such that the second hob 134 would not be laterally biased against a side of the filament. The handle member 188 and cam member 184 may thus be considered a release mechanism that allows for easily transitioning between the released state and engaged state.

It is noted that in various figures, such as FIG. 1, the end of the second drive shaft 130 abuts with the handle member 188. However, in implementation, the second drive shaft 130 would not be that long and would not contact or otherwise engage handle member 188. The drawing simply has the drive shaft 130 drawn too long.

With reference to FIG. 4, the first and second drive shafts 128, 130 are composite shafts that include outer sleeves 190, 192 and inner shafts 194, 196. The outer sleeves 190, 192 extend between and axially receive hub portions of the corresponding first and second driven gears 124, 126 and first and second hobs 132, 134. The inner shafts 194, 196 are received by and supported by bearings 143, 147, 151, 153. In other embodiments, the drive shafts could be formed from one or more components.

The power supply 110 preferably provides power at a voltage of greater than 48V to the heating elements 108. In some embodiments, the voltage may be 60 V, 72V, 84V, 96V, 110V, 120 V, 220V, or other values above 48V. Further, the power supply 110 does not exceed an amperage of 20 amps. More preferably the power supply does not exceed an amperage of 10 amps. More preferably, the power supply does not exceed an amperage of 5 amps. Further, in some embodiments where multiple independent heating elements 108 are provided the various heating elements can be controlled at a same temperature (e.g. amount of power) or controlled independently to heat the extruder barrel differently (e.g. different heating elements can be provided different levels of power to heat the extruder barrel to different temperatures along the length thereof). While a single power supply is illustrated, multiple power supplies could be provided where each heating element has its own dedicated power supply. Further, a single power supply may be configured to independently regulate the heating output of each of the heating elements.

Further, while the system illustrates a single filament extruder 100, multiple filament extruders may be daisy chained together. FIG. 7 illustrates a schematic illustration of three filament extruders 100A, 100B, 100C daisy chained together. A cable 200 (which may be a plurality of cables or wires) extends from a control unit 210 to a single one of the filament extruders, namely filament extruder 100A. Filament extruder 100A is connected to filament extruder 100B by cable 212. Filament extruder 100B is connected to filament extruder 100C by a cable 214. As such, only a single cable 200 goes back to the control unit 210 rather than having each filament extruder 100A, 100B, 100C directly connected back to the control unit 210. Typically, each of cables 212, 214 are routed separate from and remote from the routing of cable 210 between the control unit 210 and filament extruder 100A.

Control unit 210 could be any device that is needed to be connected to operate the filament extruders 100A, 100B, 100C. For example control unit 210 could be a controller that sends control signals to initiate or otherwise control the operation of the filament extruder, e.g. operation of motor 122 or other devices such as actuators for positioning the filament extruder. Further, the control unit 210 could be a power supply that powers the motor or provides power to the heating element.

By providing the daisy chained configuration, it is unnecessary to run cables for each filament extruder back to the control unit 210 which reduces weight as well reduces the issue of limited space for wiring and/or cable carriers.

Thus, in the embodiment of FIG. 7, it can be seen that there is an additive manufacturing machine that has filament extruder 100 A directly connected to control unit 210 while filament extruders 100B, 100C are indirectly connected to the control unit through their direct (filament extruder 100B) or indirect connection (filament extruder 100C) to filament extruder 100A.

While filament extruders 100A, 100B, 100C are in a daisy chain configuration, each extruder 100A, 100B, 100C, need not be identical. Further, the filament extruders 100A, 100B, 100C need not all operate at the same time or be controlled in the same manner.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filament drive for an extruder for an additive manufacturing system comprising:
   a motor;
   a drive gear driven by the motor about a drive gear axis of rotation;
   a first driven gear operably engaged with and driven by the drive clear;
   a first hob having a toothed outer periphery connected to the first driven gear such that rotation of the first driven gear rotates the first hob about a first hob axis of rotation;
   a second driven gear operably engaged with and driven by the drive gear;
   a second hob having a toothed outer periphery connected to the second driven gear such that rotation of the second driven gear rotates the second hob about a second hob axis of rotation, the toothed outer peripheries of the first and second hobs defining a filament receiving zone therebetween;
   a first drive shaft between the first driven gear and the first hob, the first drive shaft rotating about a first drive shaft axis that is perpendicular to the drive gear axis of rotation, the first drive shaft being rotatably supported proximate the first driven clear and being rotatably supported proximate the first hob; and
   a second drive shaft between the second driven gear and the second hob, the second drive shaft rotating about a second drive shaft axis that is perpendicular to the drive gear axis of rotation, the second drive shaft being rotatably supported proximate the second driven gear and being rotatably supported proximate the second hob;
   wherein the second drive shaft is movably mounted relative to the first drive shaft such that an end of the second drive shaft proximate the second hob can be moved toward or away from the first hob to adjust a size of the filament receiving zone therebetween, wherein movement of the second drive shaft relative to the first drive shaft adjusts an angle between the first and second drive shaft axes; and
   wherein the first driven gear and second driven gear remain engaged with the drive gear when the second hob is moved toward or away from the first hob.

2. The filament drive of claim 1, further comprising a biasing system having an engaged state providing a first amount of biasing force biasing the second hob toward the first hob and a released state providing a second amount of biasing force biasing the second hob toward the first hob, the second amount of biasing force being less than the first amount.

3. The filament drive of claim 2, wherein the biasing system includes a spring operably providing the first amount of biasing force.

4. The filament drive of claim 3, further including a release mechanism transitioning the biasing system between the engaged state and the released state.

5. The filament drive of claim 1, wherein the second drive shaft is mounted on a pair of self-aligning bearings.

6. The filament drive of claim 1, wherein the first driven gear and second driven gear remain engaged with the drive gear when at least one of the first or second hobs is moved to a disengaged state where it would not engage a filament being processed.

7. The filament drive of claim 1, further including a biasing system that provides a spring loaded biasing force biasing the second hob towards the first hob.

8. The filament drive of claim 7, wherein the second hob is free floating under the spring loaded biasing force biasing the second hob towards the first hob.

9. A filament extruder comprising:
   the filament drive of claim 1;
   an extruder barrel defining a central cavity having an inlet end and an outlet end, the inlet end aligned with the filament receiving zone of the filament drive such that a filament driven by the filament drive is driven into the inlet end of the extruder barrel; and at least one heating element adjacent the extruder barrel to heat the filament driven through the central cavity.

10. The filament extruder of claim 9, wherein the at least one heating element includes at least two heating elements adjacent the extruder barrel and axially offset from one another along the extruder barrel, wherein the at least two heating elements are controlled independent of one another.

11. The filament extruder of claim 9, wherein the at least one heating element includes at least two heating elements adjacent the extruder barrel and axially offset from one another along the extruder barrel, wherein the at least two heating elements are controlled the same as one another.

12. A filament extruder comprising:

the filament drive of claim 1;

an extruder barrel defining a central cavity having an inlet end aligned with the filament drive such that a filament driven by the filament drive is driven into the inlet end of the extruder barrel;

at least one heating element adjacent the extruder barrel to heat the filament driven through the central cavity; and a power supply providing power to the at least one heating element, the power supply providing voltage of greater than 48 volts to the at least one heating element.

13. The filament extruder of claim 12, wherein the power supply provides power at less than 20 amps.

14. The filament extruder of claim 12, wherein the power supply provides power at less than 10 amps.

15. The filament extruder of claim 12, wherein the power supply operates on line voltage.

16. An additive manufacturing machine comprising:

a control unit;

a first filament extruder defined by the filament extruder of claim 12 directly coupled to the control unit;

a second filament extruder indirectly coupled to the control unit by being coupled to the first filament extruder.

* * * * *

UNITED STATES PATENT AND TRADEMARK OFFICE
CERTIFICATE OF CORRECTION

PATENT NO. : 11,433,611 B2
APPLICATION NO. : 16/570692
DATED : September 6, 2022
INVENTOR(S) : Robert Schroeder et al.

It is certified that error appears in the above-identified patent and that said Letters Patent is hereby corrected as shown below:

In the Claims

Column 8, Line 17, cancel the text "proximate the first driven clear and being rotatably", and insert the following -- proximate the first driven gear and being rotatably --

Signed and Sealed this
Eighth Day of November, 2022

Katherine Kelly Vidal
*Director of the United States Patent and Trademark Office*